May 19, 1925. Re. 16,079

A. O. LUNDELL

VISCERA AND HEAD INSPECTION TABLE

Original Filed May 20, 1922

Inventor

Alvin O. Lundell

By William A. Strauch

Attorney

Reissued May 19, 1925. Re. 16,079

UNITED STATES PATENT OFFICE.

ALVIN O. LUNDELL, OF CHICAGO, ILLINOIS, ASSIGNOR TO THE ALLBRIGHT-NELL CO., OF CHICAGO, ILLINOIS, A CORPORATION OF ILLINOIS.

VISCERA AND HEAD INSPECTION TABLE.

Original No. 1,445,632, dated February 20, 1923, Serial No. 562,560, filed May 20, 1922. Application for reissue filed February 6, 1925. Serial No. 7,436.

*To all whom it may concern:*

Be it known that I, ALVIN O. LUNDELL, a citizen of the United States, residing at Chicago, county of Cook, State of Illinois, have invented new and useful Improvements in Viscera and Head Inspection Tables, of which the following is a specification.

The present invention relates to improved methods and apparatus for inspecting viscera and heads of freshly killed animals.

More particularly, the invention relates to improved methods of inspecting carcasses, viscera and heads of freshly killed animals, especially useful in packing houses where the rate of slaughter is relatively slow.

It has been the prior practice in inspecting freshly killed animals where the rate of slaughter is relatively high, to eviscerate the carcasses, and partially sever the heads therefrom. The viscera are then deposited in isolated compartments of a conveyor and conveyed through an inspection space in predetermined relation to the respective carcasses from which they have been removed and which are carried on overhead conveyors through the inspection space.

The conveyor compartments are sterilized thoroughly after each use, and the animal parts are rapidly and efficiently inspected, infected parts are rejected, and no contamination of healthy by diseased parts occur. The rate of handling carcasses in this manner is such that different inspectors are usually required to examine the heads and carcasses, and the viscera. This prior method of handling carcasses is especially adapted for use in large establishments, but where the rate of slaughter is lower, the cost of inspection becomes relatively high and a large number of smaller packing houses will not install such inspection units.

Another prior method of inspection utilized in smaller establishments is to deposit the heads and viscera on a stationary table for inspection. This method is inefficient and unsanitary, but permits one inspector to inspect the animal parts.

In my improved method and apparatus, a separate compartment in which the heads may be deposited, is added to each viscera compartment of the well known movable conveyor or inspection tables above mentioned. The viscera and heads are removed from the carcasses deposited in the related conveyor compartments provided therefor, conveyed through an inspection space in predetermined relation with respect to the carcasses from which they have been removed, and which are carried along on overhead conveyors or otherwise. One inspector can then efficiently handle the parts to be inspected, and the sanitary operation of the prior movable inspection tables may be attained. By utilizing my improved method and apparatus, more economical and sanitary inspection is effected.

It is an object of this invention to provide an improved device whereby the viscera and the head of a carcass after being removed are adapted to be carried along for inspection.

A further object of the invention is to provide each of the compartments of a movable inspection table with receptacles adapted to hold the removed heads of carcasses to permit inspection of the same.

Another object of the invention is to provide each of the compartments of a movable inspection table with a holder for carrying the removed head of a carcass along with a viscera removed from the same carcass.

It is an important object of this invention to provide a simple and effective movable endless inspection table wherein the head and the viscera of the same carcass are carried along simultaneously past an inspector to permit him to examine both the head and the viscera, as they are carried along opposite the carcass from which they have been removed.

Other and further important objects of this invention will be apparent from the disclosures in the drawings and specification.

In the annexed drawings so much as is novel in a preferred embodiment of apparatus for carrying out my invention is disclosed, it being understood that well known types of overhead conveyors for the carcasses and sterilizing means for the table are to be used.

Figure 1:
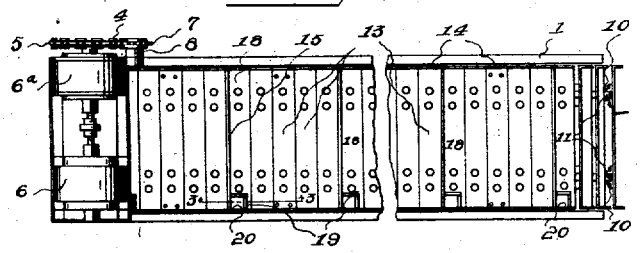
Fig. 1 is a top plan view of an inspection table embodying the principle of this invention.
Figure 2:
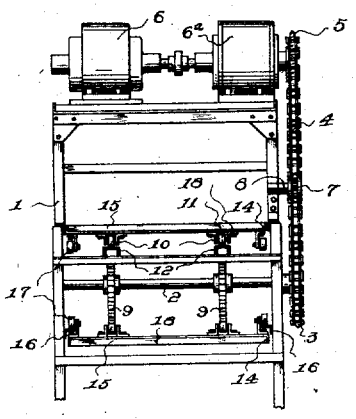
Fig. 2 is an end elevation thereof.

The inspection table comprises a supporting frame 1 having transverse shafts 2 journalled in suitable bearings near the ends of said frame. Keyed or otherwise secured on one projecting end of one of the shafts 2 is a sprocket wheel 3 adapted to be driven by means of an endless chain 4 which is trained around a driving sprocket wheel 5. The sprocket wheel 5 is driven by a motor 6 and a gear set 6[a] which are connected together and mounted upon the frame 1 near one end of the table. A sprocket pinion 7 is mounted on a stub shaft 8 supported on the frame 1 in a position to permit the sprocket pinion 7 to tension the chain 4.

Secured on each of the shafts 2 are sprocket wheels 9 around which conveyor chains 10 are trained. The chains 10 are provided with rollers 11 which are adapted to run on guide tracks or rails 12 secured longitudinally on the supporting frame 1. Attached transversely of the chains 10 are a plurality of flat flights, slats or cleats 13 provided at both ends with integral outwardly turned flanges 14. The slats 13 form a movable endless inspection table having compartments formed thereon by means of flanges which are rigidly secured to or integrally formed on certain of said slats 18 to form transverse partitions or plates 15. Parallel guide rails or tracks 16 are mounted on the frame uprights. To support the lower run of the endless inspection table, certain of the slats 13 and 18 have mounted at the ends of the inner surfaces thereof guide rollers 17 which are adapted to track on the rails 16.

Figure 4:
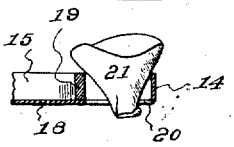
Fig. 4 is an enlarged cross section of one of the head receptacles showing a head seated therein.
Figure 5:
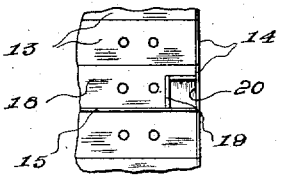
Fig. 5 is a top plan view of a fragmentary portion of the conveyor.
Figure 3:
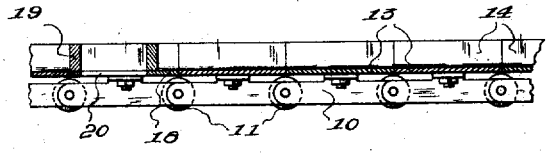
Fig. 3 is an enlarged detail section taken on line 3—3 of Fig. 1.

The inspection table is divided into compartments each adapted to receive an individual viscera. Formed in one corner of each table compartment is a holder or receptacle 19 adapted to receive and hold the removed head of a carcass. Each holder 19 is provided with a bottom opening 20 to permit the snout of a removed carcass head 21 to project therethrough as illustrated in Fig. 4. The viscera from the same carcass is deposited in the respective compartment of which the head holder forms a part.

The operation is as follows:

The inspection device embraces the endless conveyor or table which is divided into compartments each adapted to receive an individual carcass viscera removed by an eviscerator from a carcass carried along by an overhead conveyor (not shown). The eviscerated viscera is deposited in one of the table compartments opposite the moving carcass from which it has been removed. The eviscerator or other employee also removes the head from the respective carcass and deposits said head in the holder or receptacle 19 mounted in the corner of the compartment carrying the viscera of said carcass.

The viscera and head of a moving carcass are carried along opposite or adjacent the carcass from which they have been removed. The associated viscera and head of a particular carcass are thus carried past an inspector who stands beside the traveling table and inspects not only the viscera but the head as well. If both the viscera and the head are free from disease or other objections, they are passed on to be discharged. If, however, a viscera is found to be diseased, it is tagged or otherwise identified as is also the respective head and the carcass. Should the viscera be free from disease, the corresponding head, carried in the compartment head holder 19, is inspected to ascertain whether or not there are any signs of disease in the head. If the head is diseased, it is tagged as may also be the respective viscera and the carcass. It will thus be seen that both the viscera and head of a particular carcass may be handled without contacting with other parts and are thoroughly inspected before the carcass is permitted to pass as fit for use as food. No contamination of healthy by diseased parts can occur by contacting or otherwise, as each part is deposited in a separate and individual compartment.

It will of course be understood that the head holders 19 may be of any desired shape or construction and may be mounted in any convenient place in a compartment other than the location shown and described.

I am aware that numerous details of construction may be varied through a wide range without departing from the principles of this invention, and I therefore do not purpose limiting the patent granted otherwise than necessitated by the prior art.

I claim as my invention:

1. The combination with a movable viscera inspecting table, of means thereon for dividing the table into compartments, and head holders on said table in said compartments.

2. An inspection device comprising an endless table, means for driving the same, members on said table for dividing the table into compartments for receiving viscera, and a receptacle for each of said compartments for receiving the removed head of the same carcass from which the viscera in the respective compartment has been removed.

3. The combination with a viscera inspection table, of carcass head holders secured thereon to permit the viscera and the head removed from a particular carcass to be associated with each other for inspection.

4. An inspection device comprising endless chains, means for driving the same, a plurality of flanged slats secured to said chains to form a table, plates secured to certain of said slats to divide the table into viscera receiving compartments, and a carcass head receptacle secured to certain of the slats of each compartment.

5. An inspection device comprising a movable endless table embracing a plurality of transverse slats flanged outwardly at both ends, flanges on certain of said slats to divide the table into viscera compartments, and a head holder secured in each of said compartments and opening through the table to permit the snout of a removed carcass head to project therethrough.

6. An inspection device comprising a movable endless table embracing a plurality of transverse flights flanged outwardly at both ends, certain of said flights having an opening therein, a partition secured to each of the flights having an opening therein, said partitions dividing the table into compartments, and a head holder around the opening in each of the flights having an opening therein.

7. An inspection device of the class described comprising a movable endless table having openings therein, means for dividing the table into separated compartments so that each compartment will include one of the openings, and a holder in each compartment around the opening therein.

8. The combination with an inspection table divided into viscera receiving compartments, of a head holder in each of said compartments.

9. An inspection table having two sets of compartments, one set disposed within the other, whereby the viscera and heads of carcasses may be associated with one another.

10. The method of handling freshly killed animals which comprises severing the heads and removing the viscera from the carcasses; conveying or moving the eviscerated and decapitated carcasses and their respective heads and viscera through an inspection space in substantial proximity to each other so that the related carcasses, heads and viscera may be readily identified; and isolating each viscera and each head from each other and from the other viscera and heads while passing through the inspection space.

11. The method of handling freshly killed animals which comprises severing the heads and removing the viscera from the carcasses; conveying or moving the decapitated and eviscerated carcasses and their respective heads and viscera in substantial proximity to each other so that the related carcasses, heads and viscera may be readily identified; and isolating each viscera and each head from all other animal parts while being conveyed or moved so that the viscera and heads may be handled individually without causing contamination of healthy by diseased parts through contacting, leakage of blood or juices and the like.

12. Apparatus for handling and inspecting freshly killed animals which comprises an endless conveyor with isolating compartments in which the viscera of the animals may be deposited, carried along in relatively close, predetermined, and fixed relation with respect to the carcasses from which said viscera have been removed, and inspected and handled without contacting with other animal parts or juices therefrom; and compartments or supports in which the heads of the animals may be deposited, carried along in relatively close, predetermined and fixed relation with the carcasses from which said heads have been removed, and inspected and handled without contacting with other animal parts or juices therefrom.

In testimony whereof, I affix my signature.

ALVIN O. LUNDELL.